UNITED STATES PATENT OFFICE.

GEORGE W. MILES, OF SANDWICH, MASSACHUSETTS.

METHOD OF MODIFYING RESIN AND THE PRODUCT THEREOF.

1,401,348. Specification of Letters Patent. Patented Dec. 27, 1921.

No Drawing. Original application filed January 10, 1919, Serial No. 270,605. Divided and this application filed January 7, 1920. Serial No. 349,997.

*To all whom it may concern:*

Be it known that I, GEORGE W. MILES, a citizen of the United States, and resident of Sandwich, in the county of Barnstable and State of Massachusetts, have invented new and useful Improvements in Methods of Modifying Resin and the Product Thereof, of which the following is a specification.

My invention consists in a method of modifying resin by oxidation and in the oxidized resin which is the product of the method. An object of the invention is to produce a form of resin capable of forming a resin-ammonia soap which, unlike resin-ammoniate as heretofore produced, is capable of indefinite extension or dilution in water. The ammoniate of my new oxidized resin constitutes a water resistant coating material, applicable to a miscellany of objects, as for instance paper. The method of preparing the oxidized resin ammoniate, and the ammoniate itself, forms the subject matter of my application for United States Letters Patent, Serial No. 270,605, filed January 10, 1919, of which this case is a division.

In order to become capable of forming an indefinitely extensible ammoniate, resin must be quite thoroughly oxidized, and so far as I am informed, such oxidation of resin as may heretofore have taken place by exposure to air has been, at the utmost, a superficial reaction, affecting only a minor part of the resin, even though it has been in comminuted condition. Oxidation of resin by simple exposure to air will not proceed to anything approaching adequate modification of the whole body of resin, unless, in addition to comminution, the resin be repeatedly agitated in contact with air, over a period of months.

I have discovered three modes of oxidizing resin with that degree of thoroughness which is requisite to the obtainment of a resin capable of forming an indefinitely extensible or soluble ammoniate; these modes are exemplified by the following:

Grind ordinary rosin to a very fine powder, spread it so as to expose as much as possible to the air, and repeatedly stir it, so as to expose all the particles, and also, so as to separate portions which have oxidized from the underlying unoxidized parts of the particles, thus exposing fresh surfaces to the action of oxygen in the air. If this process be protracted for a long time, for weeks or months, the comminuted rosin will eventually become oxidized to that degree of thoroughness which is requisite to formation of an indefinitely extensible rosin-ammonia soap. Heating the rosin will assist the operation. The length of time required cannot be stated with accuracy; when the rosin yields by sample a clear fluid solution in an equal weight of water, which contains that quantity of ammonia requisite to saponify the resin, and this solution proves capable of indefinite extension, the indication is that the oxidation has proceeded to completion.

The foregoing method of oxidation is, however, so laborious and uncertain, that I do not recommend it, if either of the other methods I have discovered, is available.

One of these, which, like that of exposure to air is one of simple or unprovoked oxidation, is to subject finely powdered rosin to the action of a strong solution of hydrogen peroxid. Stirring the rosin in the peroxid solution accelerates the oxidation, which becomes complete (as indicated by the same test as above described) in a much shorter time than is necessary when the simple air-exposure method is employed. My explanation of this—which I advance tentatively—is that the solution of hydrogen peroxid brings the oxygen into a more intimate contact with the rosin than is possible in dry air, and that agitation of the resin during treatment loosens the oxidized portions, as they are formed, from portions remaining unoxidized, thus exposing them to the direct action of the free oxygen in the solution. I hesitate to prescribe any time limit for the operation, because I have found that indeterminate variables of condition enter into the process. The time required for the hydrogen peroxid method to produce its full effect is measured by hours, as contrasted with weeks in the former case.

The third variation of method is one which may be called promoted or provoked oxidation, and involves preparation of rosin by wetting or saturating or otherwise intimately associating it with a substance which, when the resin is afterward exposed to air will remain lodged on, or in, the particles of rosin, and stimulate an oxidation. The indications are that the operation is catalytic.

I have discovered several substances which operate as promoters of oxidation of resin, and which, in various degrees, expedite and render uniform the desired oxidation.

In each case, grind rosin to a powder, and first saturate it with a solution of the promoter of oxidation; then dry the prepared rosin powder, exposing it to air thoroughly. Substances which I have discovered to be effective as promoters of oxidation of rosin are: calcium hypochlorite (bleaching powder) formaldehyde, dilute sulfuric acid, solution of sulfur dioxid in water, milk of lime with a small percentage of soda ash, and turpentine.

The specific method which I believe to yield the best results is as follows:

Melt rosin, add thereto a mixture of 5% turpentine, 1% soda ash, and ½% slaked lime (these percentages being on the weight of rosin) and mix thoroughly. Cool and then grind the mixture to pass a 60 mesh sieve; expose the comminuted mass to air at a temperature about 110° F. (preferably tumbling or agitating it occasionally) until a sample yields a clear and indefinitely extensible fluid solution in an equal weight of water containing the requisite amount of ammonia for saponification.

The oxidized rosin produced by any of the above described variations on the fundamental method will be found capable of forming an ammoniate, indefinitely extensible in water.

I claim:—

1. The method of modifying rosin, which consists in distributing through it a substance provocative of oxidation, thereafter oxidizing the rosin until capable of forming an ammoniate indefinitely extensible in water.

2. The method of modifying rosin, which consists in distributing through it a mixture of turpentine, soda ash and slacked lime, thereafter oxidizing the rosin until capable of forming an ammoniate indefinitely extensible in water.

3. The method of modifying rosin, which consists in making a fused mixture of the rosin with turpentine, soda ash and slaked lime, thereafter cooling and comminuting the mixture and exposing it to oxygen until capable of forming an ammoniate indefinitely extensible in water.

4. The method of modifying rosin, which consists in making a fused mixture of 100 parts rosin, 5 parts turpentine, 1 part soda ash and ½ part slaked lime; cooling and comminuting said mixture, and thereafter exposing it to oxygen at about 110° C. until it is capable of forming an ammoniate indefinitely extensible in water.

Signed by me at Boston, Massachusetts, this fifth day of January, 1920.

GEORGE W. MILES.